UNITED STATES PATENT OFFICE.

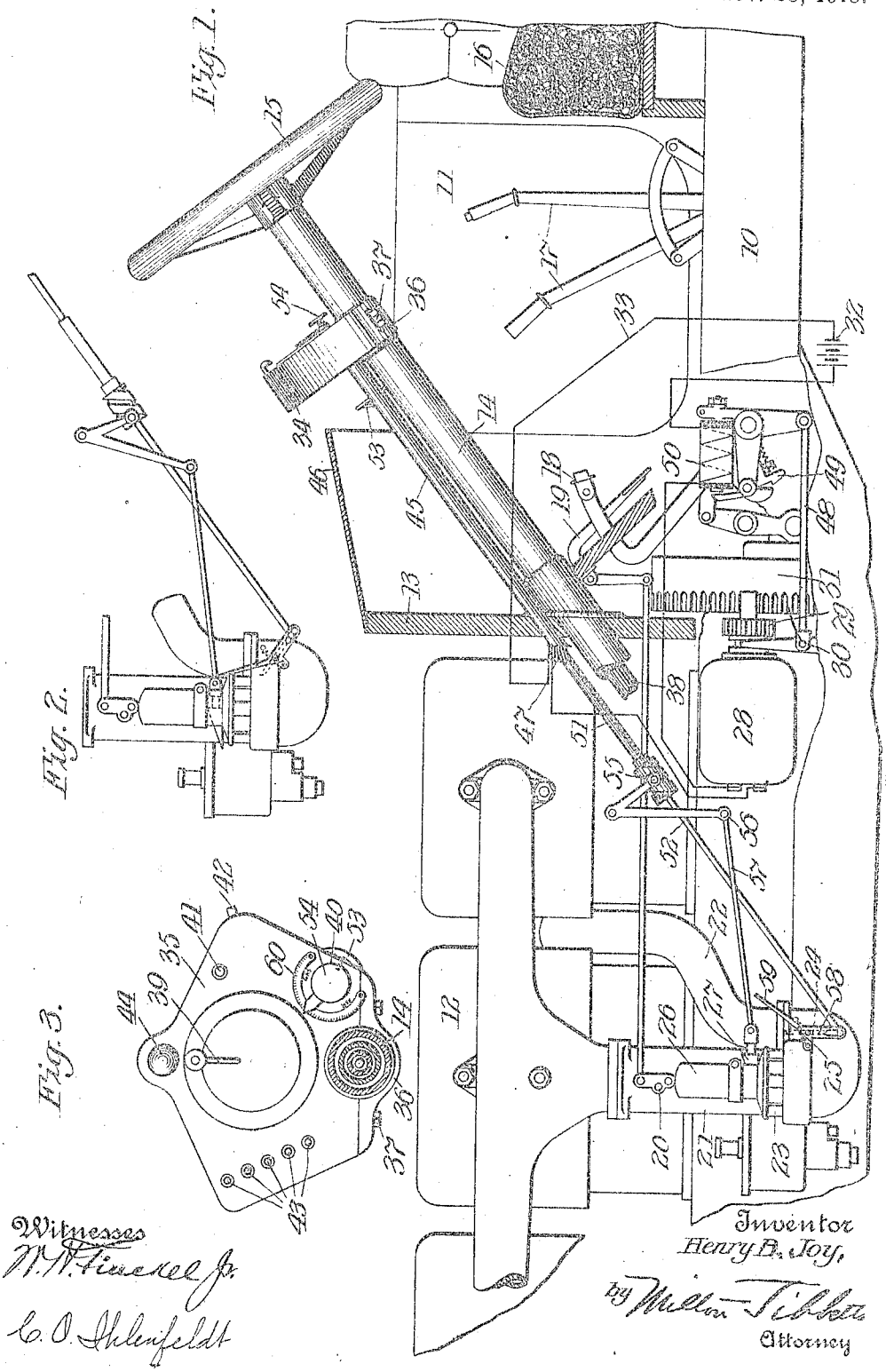

HENRY B. JOY, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,161,389.  Specification of Letters Patent.  Patented Nov. 23, 1915.

Application filed April 25, 1912. Serial No. 693,019.

*To all whom it may concern:*

Be it known that I, HENRY B. JOY, a citizen of the United States, and resident of Detroit, Wayne county, State of Michigan, have invented certain new and useful Improvements in Motor-Vehicles, of which the following is a specification.

This invention relates to motor vehicles and particularly to the mechanism for controlling the motor and its auxiliaries.

Heretofore it has been customary to mount most of the switches and levers controlling the motor and the electric circuits of a motor vehicle upon the dash or various parts of the body. In some instances some of the control levers have been mounted on the steering wheel. There are numerous objections to these positions principal among which are their inaccessibility when mounted on the dash and their interference with the proper function of the steering wheel when mounted thereon.

It is one of the objects of the present invention to provide a support the principal function of which is to carry the motor control switches and levers and other hand operated devices and arrange them convenient for hand operation and constant inspection by the operator without interfering in any way with his use of the steering wheel. The support in question may be called a controller board or switch board and preferably it is in the form of a casing having a flat face upon which the various control levers and switches are mounted. The wires and other connected parts are arranged within the casing. Preferably also there is a tubular housing extending from this casing downwardly and forwardly to the dash or to the motor for the purpose of protecting the wires and rods leading from said casing to the operating parts of the motor and auxiliary mechanisms.

The controller or switch board may be supported by the tubular housing or it may be mounted directly on the steering post, while in some cases it may be more convenient to support the board from the dash or the forward part of the body, and in any case it is arranged beneath and in front of the steering wheel and within a few inches of the latter where it may be conveniently reached by the operator.

In a motor vehicle fitted with a hydrocarbon engine which is provided with an electric motor or other self starting motor for the purpose of "cranking" the hydrocarbon engine to start it on its cycle of operation, there are a number of operations that have to be performed by the driver in starting the engine and getting the vehicle under way. Heretofore the various switches and levers which the driver has to operate in this connection have been designed mostly for operation by the feet and this has been found to present many objections making starting slow and inconvenient, almost as much so as the older method of hand cranking. In the present invention the parts to be operated are so arranged that most of the levers and switches are within view of the driver and easily operated by him by hand and those levers which need to be operated in quick succession are arranged most advantageously for that purpose.

As illustrating the invention reference may be had to the drawings forming a part of this specification, in which—

Figure 1 is a side elevation and part section of the forward part of a motor vehicle showing the engine and means for controlling it; Fig. 2 shows the engine carbureter with certain of its parts in different positions; and Fig. 3 is a face view of the controller- or switch-board.

The side members 10 of the motor vehicle frame support the body 11 and the internal combustion engine 12. The dash 13 is also mounted on the frame and the inclined steering post 14 extends upwardly and rearwardly from the dash and is provided at the upper end with a steering wheel 15 which is suitably arranged convenient to the driver's seat 16. The gear and brake levers 17 are within reach of the driver's hand and the clutch lever 18 and accelerator pedal 19 may be operated by his feet. The accelerator pedal 19 is suitably connected with the throttle valve 20 of the carbureter 21, which carbureter has a main air intake pipe 22 and an auxiliary air intake passage 23, both of which intakes are controlled by valves. The valve 24 of the main air intake is of the butter-fly type and is retained in open position by the spring 25, this valve being closed only to choke off the air and provide a very rich mixture for starting purposes. It is necessary that it should be opened immediately as the engine starts so that the engine may receive sufficient air to prevent choking.

The auxiliary air valve is controlled by springs within the casing 26 which are adjustable by the wedge 27 for determining the richness of the mixture when the engine is running. This wedge 27 is also used to place extreme tension on the valve springs for the purpose of holding the valve tightly closed to enrich the mixture for starting the engine and these springs should also be released to some extent immediately as the engine starts to prevent choking.

Suitably mounted on the engine or vehicle frame is an auxiliary motor 28, preferably an electric motor, which has a sliding gear 29 adapted to mesh with teeth 30 on the engine fly-wheel 31. This auxiliary motor is operated by a battery 32 through the circuit 33.

For the purpose of bringing the control devices of the engine and auxiliary motor to a position convenient for the driver, a controller-board 34 is provided and is arranged slightly below and forwardly of the steering wheel 15. This controller- or switch-board 34 comprises a casing preferably of cast aluminum and having a flat fact 35 presented to the driver's view. In the form of the invention shown the casing is detachably supported on the steering post 14 by means of the block 36 and bolts 37. The steering post 14 is stationary, the steering shaft 38 upon which the steering wheel 15 is mounted being adapted to rotate inside the post.

The controller-board is of suitable shape to support the engine ignition coil and switch 39, the carbureter control devices 40, the starting switch 41, the electric horn push button 42, the push buttons 43 for the electric lights of the vehicle, and the electric lamp 44 for lighting up the face of the board. This arrangement brings within easy reach of the operator's hand all those devices of the vehicle that require careful or instant adjustment. Particularly does this bring to the operator's hand the devices for starting and stopping the engine and controlling the gas mixture as the engine starts. The arrangement of the various devices on the board are best shown in Fig. 3 where it will be seen that the devices 40 for controlling the mixture are arranged contiguous to the switches 39 and 41 so that the carbureter valves may be controlled immediately as the engine starts either by throwing on the spark with the switch 39 or by operating the starting motor with the switch 41.

The various wires and other connections leading from the devices on the controller-board may be led from the board to the motor or to a point forward of the dash 13 by a housing 45 in the shape of a tube, which tube may if required be of sufficient strength and diameter to support the entire controller-board if it is desired to support the board independently of the steering post. Also the controller-board may be supported independently of the steering post by other brackets from the dash 13 or from the body part 46.

It will of course be understood that the starting switch 41 is connected through two of the conductors 47 with the circuit 33 of the battery and electric motor. Also the sliding gear 29 may be caused to engage with the fly-wheel 31 by means of its connection with the clutch lever 18 through link 48 and the dog 49 which is electrically controlled through magnet 50 in the circuit 33.

The carbureter control devices 40 consist of two rods 51 and 52 which pass through the controller-board, the rod 51 being adapted to be rotated by the hand wheel 53 and the rod 52 being moved up and down by the button 54 at the upper end thereof. The rotation of the rod 51 causes a reciprocation of the wedge 27 through the spiral cam and pin connection 55, bell crank 56 and link 57.

The valve 24 is shown held in open position by the spring 25 in Fig. 1 and in Fig. 2 it is retained in closed position by the same spring, the arm to which the spring is attached having passed over the dead center. The operating arm 58 for this valve is directly connected to the operating rod 52 by which the valve is shifted and in order that the two valves may be opened by a single movement of the operator's hand a finger 59 extends from the arm 58 in the path of the wedge 27 so that when the wedge is withdrawn its initial movement moves the finger 59 throwing the valve 24 over the dead center so that it is snapped open by the spring 25. A scale 60 on the face of the controller-board indicates the position of the wedge 27.

Having thus described my invention what I claim is:

1. In a motor vehicle the combination with the vehicle dash, a motor forwardly thereof, and including a carbureter having mixture regulating valves, and a non-rotatable steering post extending rearwardly and upwardly from the dash and having a steering wheel at the upper end, of a controller board rigidly mounted on the steering post between the dash and steering wheel, a tubular casing rigidly secured to the controller board and extending therefrom to and through the dash, manually operable devices on said controller board and connections therefrom for controlling said valves, a control switch on the controller board adjacent said manually operable devices, and wiring from said switch extending through said tubular casing to the motor.

2. In a motor vehicle, the combination with the vehicle motor, a carbureter having mixture regulating valves, an auxiliary motor for cranking said vehicle motor, and the steering post and wheel thereon, of a controller board mounted on said steering post within reach of the operator, a device on said controller board and connections therefrom for manually controlling said mixture regulating valves, and a device on said controller board mounted adjacent the first said device and connections therefrom for manually controlling the starting and stopping of said auxiliary motor.

In testimony whereof I affix my signature in the presence of two witnesses.

HENRY B. JOY.

Witnesses:
W. H. FINCKEL, Jr.,
G. A. SCHROEDER.